United States Patent [19]

Hunsicker

[11] Patent Number: 4,656,657
[45] Date of Patent: Apr. 7, 1987

[54] TELEPHONE MONITORING DEVICE

[76] Inventor: Richard Hunsicker, 40 Summit Rd., Sparta, N.J. 07871

[21] Appl. No.: 787,690

[22] Filed: Oct. 15, 1985

[51] Int. Cl.$^4$ .......................................... H04M 15/18
[52] U.S. Cl. ................... 379/140; 379/119; 379/131
[58] Field of Search ............ 179/7 R, 7 MM, 7.1 TP, 179/7.1 R, 90 BD

[56] References Cited

U.S. PATENT DOCUMENTS

| | | | |
|---|---|---|---|
| 3,769,463 | 10/1973 | Graham et al. | 179/7.1 TP |
| 4,275,272 | 6/1981 | Mennino Jr. et al. | 179/7.1 TP |
| 4,404,433 | 9/1983 | Wheeler et al. | 179/7.1 TP |
| 4,410,765 | 10/1983 | Hestad et al. | 179/7.1 R |

Primary Examiner—Gene Z. Rubinson
Assistant Examiner—David R. Schuster
Attorney, Agent, or Firm—Arthur L. Plevy

[57] ABSTRACT

There is disclosed a telephone monitoring system which system is coupled to the tip and ring lines associated with a telephone subset and which system is operative to provide output data indicative of the date and time a call is initiated, the telephone number and area code of a place called, the total minutes and seconds of the call placed, the time and day a call is started and discontinued as well as the time and date of all incoming calls. The system further includes separate timing interval apparatus to notify a user that a predetermined time period has elapsed during a telephone conversation. The system includes apparatus for monitoring the status of the subset in an off-hook and on-hook condition and to initiate various timing cycles when the subset is off-hook including a called number storage register for storing information indicative of a call to be placed by the subset during normal operation. The above noted data is applied to input terminals of a printer or display for providing the user with a hard copy printout of the data or a visual display of the same.

20 Claims, 2 Drawing Figures

TELEPHONE MONITORING DEVICE

BACKGROUND OF THE INVENTION

This invention relates to telephone monitoring devices and more particularly to a telephone monitoring device which is capable of providing information regarding the date and time a call is initiated as well as other information to enable a user to determine what calls have been made on his subset and to determine what calls have been received on his subset.

The prior art is replete with a number of patents which relate to various types of systems for monitoring telephone subsets in regard to determining the length of a call. The purpose of such prior art systems is to enable a user to gain some indication of what charges will be incurred during a telephone call. It is, of course, known that billing as well as the determination of the length of a call are also a feature incorporated in most modern telephone systems in order to enable the operator of the system such as the telephone company to determine charges in regard to such calls.

As indicated above, there have been many attempts in the prior art to provide systems for use by the consumer to enable the consumer to verify calls made and the length of time of such calls. This aspect is particularly desirable in modern day society due to the fact that there are now many companies who provide access services for the consumer. For example, such companies enable one to reduce costs in regard to long distance calls. This can be done by selecting companies such as MCI, Sprint and other such companies who will provide long distance service over lines which are leased from the telephone company.

These various companies have different charges all of which are based upon the length of a telephone call. In any event, it is very difficult to compute charges due to the vast differences in billing between the various companies. However, it is desirable to provide apparatus which will provide the following capabilities.

1. The apparatus will be able to determine the date and the time a call is initated from a subset.
2. The apparatus will be able to determine the telephone number and the area code called.
3. The apparatus will be able to give an indication of the total minutes and seconds of the call placed.
4. The apparatus will be able to give the user the time the call is disconnected and provide connect and disconnecting documentation in order to provide the user with a hard record of telephone use.

It is also an object of this equipment to give the user an indication of the time and date of all incoming calls. This is important in order to determine telephone activity and to verify in certain instances when the telephone has been accessed.

As indicated, the prior art included many such devices which attempted to monitor telephone calls. For example, U.S. Pat. No. 3,538,258 entitled TIME MEASURING AND COUNTING APPARATUS which issued on Nov. 3, 1970 to W. Zuckerman. This patent discloses a monitoring device which essentially monitors the usage of a telephone line. The device is relatively crude but serves to monitor usage of a telephone line to give an indication to the consumer of how long a telephone call has been on-line. The purpose of the device is to give one an indication of the billing period for each call made.

Other patents such as U.S. Pat. No. 3,970,793 entitled TELEPHONE CALL TOLL MONITOR AND INDICATOR by L. M. Profitt issued on July 20, 1976. This patent also describes a telephone call monitor and charge indicator. The device is a complicated device but will enable one to time a call and to give an amount in terms of dollars for the call depending upon the length of time the telephone set has been in use.

There are other patents which involve similar apparatus. See for example U.S. Pat. Nos. 4,041,291, 4,091,238, and 4,275,272. These patents all relate to equipment for calculating and displaying the cost of a telephone call while it is in progress. The patents describe circuitry for developing long distance rates and using these rates as well as the time to calculate the charge for each telephone call. Other patents described above show systems which can be employed in hotels and motels where many telephones are used to give the owner of the premises a printout of the duration of a particular call as well as the identity of the caller.

As one can ascertain from the type of prior art cited above, the systems tend to be relatively complex and many systems are completely unusable due to the existence of independent companies providing long distance services.

Hence it is an object of the present invention to provide an improved apparatus which will give a telephone user a correct indication of the date as well as the time the call was initiated. It will enable the user to determine the telephone number as well as the area code accessed, the total minutes and seconds of the call placed, the time the call is disconnected, and also provide information regarding the time and date of all incoming calls.

It is an object of the present invention to provide simple and inexpensive apparatus which requires little or no interface by the consumer. As will be explained, the apparatus to be described has certain features which enable automatic operation while providing the consumer or user with a printout of information necessary to determine the length, time and date of all telephone calls made via the subset.

BRIEF DESCRIPTION OF THE PREFERRED EMBODIMENT

A telephone monitoring system for monitoring the status of incoming and outgoing calls to a telephone subset, said telephone subset capable of operating in an on-hook or off-hook condition, and including a dialer for accessing a called number in the off-hook condition, comprising means responsive to the on-off hook condition of said subset to provide a first output signal for an off-hook condition and a second output signal for an on-hook condition, storage means responsive to said first output signal for storing therein a number indicative of a dialed number for accessing a called part, means responsive to said called party answering said call for providing an output signal, a time of day and date generator responsive to said output signal for storing therein in a first mode the time and date of said answer according to said output signal, timing means responsive to said output signal for commencing a timing cycle indicative of the time said called and calling party are in communication, means responsive to said second output signal indicative of said subset being in the on-hook condition and coupled to said timing means and said time of day and date generator to cause said timing means to end said timing cycle and to cause said time of day and date generator to store in a second mode said date and time said call is ended, and display means coupled to said timing means, said time of day and date generator and operative in response to said second signal to cause the time of said call, the day and time of the start of said call and the day and time of the end of said call to be displayed for use by a user of said subset.

DETAILED DESCRIPTION OF THE FIGURES

Figure 1:
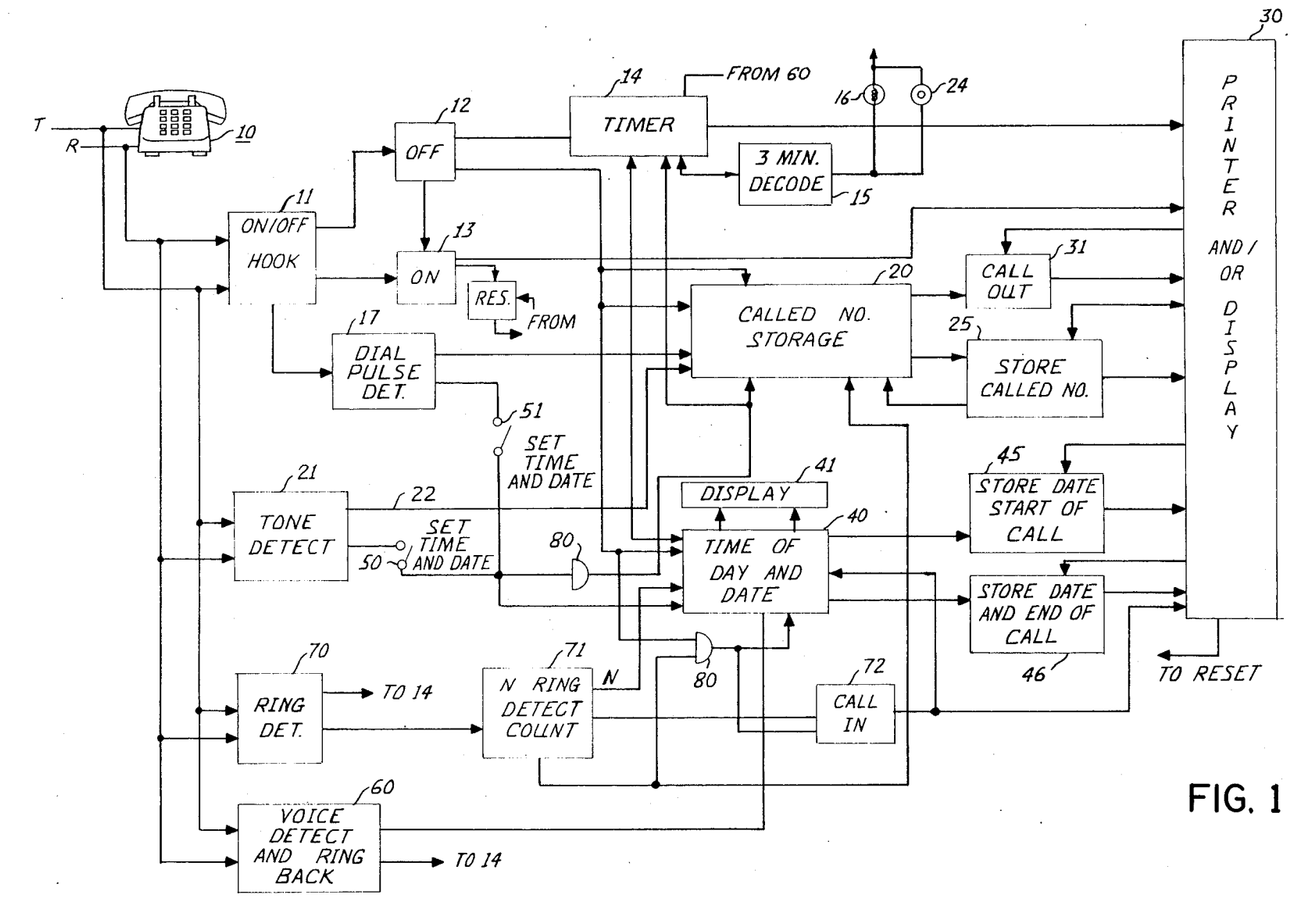
FIG. 1 is a detailed block diagram of the telephone monitoring system according to this invention.

Referring to FIG. 1, there is shown a telephone subset 10. Essentially, the subset 10, as will be explained, can be a TMF (touch tone multi-frequency) subset whereby dialing is accomplished via a set of keys each of which when depressed emits a different tone which tones are detected to determine dialing.

As is well known, certain telephones include rotary dialers which produce a number of opens and closures depending on the digit to be dialed. This will be explained subsequently.

The telephone set is associated with a trip and ring line designated as T and R in FIG. 1. The present telephone system utilizes two wires to propagate telephone signals to the subset. As is well known, power for the subset is supplied from the central office via the T and R lines. When a subset goes off-hook, battery is connected to the subset to cause a current to flow. In this manner, the telephone company via the central station detects the current flow to determine that a subscriber is requesting service or that a call has been answered.

Shown in FIG. 1 is an ON/OFF hook detector 11. On and Off hook detectors are very well known devices and many examples of such detectors exist in prior art. As indicated above, when a telephone subset 10 goes off-hook, a DC current flows and a central office battery is connected to the subset. The central office battery can be detected by the on-off hook detector to provide an output indicating that the subset is in the off or on hook condition. This is conventional.

In FIG. 1 the properties of off-hook and on-hook detection have been designated separately by modules 12 and 13. Essentially, when the subset is on-hook, there is no current flow or no connection to the central office, and this can be detected very easily by the on-hook detector. Thus as shown in FIG. 1, the off-hook detector which is part and parcel of module 11 is also represented schematically by module 12 while the on-hook detector is represented by module 13.

As can be seen from FIG. 1, there is a timer 14 which is primed when the off-hook detector detects an off-hook condition. The timer 14 is deactivated when the on-hook detector detects an on-hook condition. Essentially, as will be understood, the function of the timer 14 is to provide a time between an off-hook condition as controlled and on-hook which time is indicative of the amount of time the subset is engaged in a call. Hence the timer 14 actually produces a time in terms of minutes and seconds or hours, minutes and seconds which is indicative of the time a subset is used for a call. This time is pertinent to the length of a call as will be described.

The output of the timer 14 is directed to an input of a printer or display 30 whose function will be described subsequently. In any event, the printer 30 is included to provide a user with a hard copy of all pertinent data. Also coupled to the timer 14 is a 3-minute decoder 15. The 3-minute decoder 15 will decode the state of timer 14 when three minutes have elapsed. At the end of three minutes, the decoder 15 will energize a lamp 16 or provide an audible sound via a buzzer 17 to indicate to the user that three minutes have elapsed. This is necessary in order to allow a user to make a determination as to whether or not he wishes to terminate the call.

The timer 14 as well as the three minutes decoder are conventional digital circuitry which may employ binary multivibrators or flip flops in cascade to provide a timing based on an input clock associated therewith. Such timers are extremely well known in the art. For example, similar timers are included in the digital circuitry for watches, clocks and other devices. Also shown connected to the on-off hook detector 11 is a dial pulse detector 17. The dial pulse detector is also a well known component and functions as follows.

In the event that the telephone subset 10 is a rotary type phone, dial pulses are produced by momentarily opening and closing the T and R lines via a switch. The number of opens and closures determines the digit dialed. Thus for the digit 7, there would be 7 openings and closings of the switch. Dial pulse detection as well as dial pulse generation are very well known in the art. The function of the dial pulse detector 17 is to produce a series of pulses at the output which are indicative of the dialed number. As can be seen, the output from the dial pulse detector 17 is coupled to one input of a called number storage register 20. The called number storage register 20 is a conventional register consisting of flip flops or other storage devices which function to receive pulses indicative of the dialed digits and store those pulses in the form of a dialed number.

The number of digits required to be stored in the called number storage register 20 may include any access number, for example an access number indicative of a sprint or a MCI line as well as area code and the actual calling number. Thus the register 20 can store the necessary number of digits to implement any given phone call whether the digits be for a conventional local call as consisting of 7 digits or for a long distance call as consisting of 10 or 11 digits or for a access number plus a dialed number which may consist of 18 digits or more.

In this manner a tone detector is also coupled to the T and R line. The tone detector 21 is also a well known component and it operates to convert the TTMF signal from a TTMF subset into dial pulses at the output 22. Such tone detectors are known in the art and are available through many manufacturers of conventional integrated circuit components. The output from the tone detector via line 22 is also coupled to the input of the called number storage register 20. As can be seen from FIG. 1, the called number storage register 20 also has an input connected to the off-hook detector portion 12 of the on-off hook detector 11.

The called number storage register 20 is associated with a second register called stored-call number register 25. The function of register 25 is to receive the full number from register 20 and store that number for future use as will be explained. The number stored in register 25 is directed to the printer 30 for future printout. As will be explained, the called-number storage register 20 as well as the store-called number register 25 can only be accessed when the telephone subset goes off-hook for making or generating a call.

Hence the output of the called number storage register is also connected to a decoder called call-out which decoder 31 indicates to the printer that the information associated with the display or the printout is pertinent to an outgoing call rather than an incoming call. Also coupled to an output of the off-hook detector 12 is a time of day and date generator 40. Time of day and date generaters are also common circuitry and, for example, is the type of circuitry which is directly included in a digital watch.

The module 40 consists of a series of counters which provide hours, minutes and seconds by means of cascaded digital counters. Examples of such circuits are well known and available from many manufacturers. The time of day and date generator 40 is associated with a display 41 which display is the type of display provided on a digital watch. The display indicates the time of day as generated by the generator 40, the day as Wednesday, Tuesday, and the date. This information is displayed on display 41. It is, of course, understood that the display 41 may not include the day as Tuesday, Wednesday and so on but should include the time of day display as well as the date. Also shown coupled to the input terminals of the register 40 are outputs from the dial pulse detector 17 and the tone detector 21. These outputs are coupled via switches 50 and 51 which switches will enable a user to set the exact time in generator 40 via the telephone keyboard.

In the case of a touch tone phone or subset, the user will set the generator 40 by means of the TTMF keyboard located on the subset. In the same manner if a rotary phone is utilized, the time of day and date can be set into register 40 by means of the dial pulse detector 17 via switch 51 when it is closed. Thus a important aspect of the present system, and as will be explained, allows the consumer or user to set the time of day and date in register 40 by the use of the keyboard associated with the subset or by the use of the rotary dialer associated with the subset.

The output of the time of day and date generator 40 is coupled to first and second registers as registers 45 and 46. Register 45, as will be explained, stores the date and time at the start of a telephone call and applies its output to the printer and/or display 30. While register 46 stores the date and end of call also applying its output to the input of the printer 30. Also coupled to the T and R lines is a voice detector and ring-back detector 60. The outputs of the voice detector and ring-back detector 60 are coupled to the time of day and date generator 40 to enable the same as will be explained.

When a telephone call is made, the subset dials a called number and the remote line is rung. During the time of ringing, the calling line receives a ring-back signal which ring-back signal is detected by detector 60. The detection of ring-back is well known. If the called party answers, then ring back is tripped or disappears from line and a conversation commences. The purpose of the voice detector in conjunction with the ring detector is to determine when voices on the line to enable the time of day and date generator indicating that a call has commenced.

.Also shown coupled to the T and R lines is a ring detector 61. The purpose of the ring detector is to detect incoming ringing. Hence on an incoming ringing circuit, the ring detector will detect ringing and if the phone is not answered then the output of the ring detector is coupled to a counter 71.

The counter 71 determines that N ringing signals have been detected. When N ringing signals have been detected and the phone has not been answered, the output of the N ring detector 71 is directed to a decoder 72 which indicates that there was an incoming call and which information is sent directly to the printer or display 30.

As one can see, all components as described above are well known in the art, and many components are completely available as commercial integrated circuits as will be explained in conjunction with FIG. 2.

It is further noted that there are many modes of operation in regard to the above noted system which will be explained in detail. Many of the aspects of the system as will be shown in conjunction with FIG. 2 can be handled by a completely conventional microprocessor which can be programmed according to the procedures to be described below.

Essentially, as will be explained, the equipment shown in FIG. 1 provides a user with both a visual readout or a printout on a hard copy of the following data.

1. The date and time a telephone call is initiated.
2. The telephone number and the area code called as well as any access number for example that may be necessary to make a call as for example an access number associated with MCI or a Sprint system.
3. The total minutes and seconds of the call placed.
4. The time the call is disconnected or terminated.
5. The time of all incoming calls as well as the length of an incoming call if the call is completed.

It is interesting to note that the equipment will furnish one with the time of all incoming calls even if there is no one at the subset to answer. This will be provided in a hard copy printout as via printer 30. It is also understood that all data that is capable of being printed out can be displayed by an LED or other display which may be included on printer 30 or which may be a separate device. Such displays as well as printers are well known as will be subsequently explained.

As seen from FIG. 1, the entire unit is coupled to the T and R lines of the telephone which essentially is a very simple connection to make. The initial procedure for setting the unit is as follows.

If the unit employs a TTMF dialing mechanism, switch 50 would then be closed. The closing of switch 50 activates gate 80. The activation of gate 80 inhibits the called number storage register 20 as well as timer 14. The purpose for this is that the consumer will now go off-hook in order to obtain central office battery to energize the rotary dialer or the TTMF dialer. Due to the fact that the timer 14 as well as the called number storage registers are inhibited, this will not be recognized by the system as a valid call but rather be recognized as a time of day and date setting mechanism. The consumer will then dial in the time utilizing the telephone dialer. In the case of the TTMF dialer, the tone detector will produce a series of pulses indicative of the time dialed in which pulses would be coupled via gate 80 to the generator 40.

The generator 40 is an ordinary digital counter which will respond to the dialed impulses to enable the consumer to set the time. It is, of course, noted that the consumer can merely utilize any single button to affect the time change as the time will be displayed on display 41. This is a conventional technique which for example is employed in video tape recorders or digital watches and other similar devices. The consumer then will use the telephone dial or subset control to then set the date via the telephone by viewing the display 41. It is, of course, understood at the onset that such setting can be accomplished by a pulse at a time. In other words, due to the fact that a display is employed, the consumer can utilize the telephone to generate as many pulses as he desires and hence advance, for example, the minute or hour digits by the use of any of the keys as 0 through 9. This can also be accomplished by means of the rotary dialer which would be incorporated in a rotary telephone set.

Once the generator 40 has been set and the display is indicating the correct time, the system basically is available for use. As should be apparent, the system therefore provides a clock via display 41 which gives the consumer the time as well as the date.

VARIOUS OPERATING MODES

The Subscriber Places A Call

In order for a subscriber to place a call the subscriber lifts the handset associated with the subset 10 and essentially goes off-hook. By going off-hook the off-hook detector 12 is activated which detector then primes the input timer 14. The input timer does not commence counting at this moment. In any event, the off-hook detector 12 also enables the called number storage register 20 anticipating dial pulses due to the fact that the subscriber went off-hook. As will be explained, the system can distinguish between the initiation of a call and going off-hook due to receiving at call. In any event, when the subscriber goes off-hook by lifting the handset of subset 10, the off-hook detector 12 primes the called number storage register 20. The subscriber then will dial the appropriate number. This number is coupled to the storage register 20 in terms of pulses either via the dial pulse detector 17 or the tone detector 21, both of which convert dialing into pulses. The called number storage register 20 then receives the number dialed and as soon as all digits have been dialed, as determined by the end of dial pause, the register 20 transfers its stored data to register 25 which register 25 now stores the called number. At the completion of storing the called number, register 25 inhibits register 20 so that register 20 will not update its data nor be responsive during the remainder of a call.

Once the telephone number has been dialed into the telephone system, the telephone system will attempt to make a connection between the calling line indicative of subset 10 to the called line whose telephone number is now stored in register 25. As soon as a connection is made via the telephone system, the subscriber or subset 10 via the T and R lines receives ring back. This ring back signal is detected by detector 60 which also has the ability to detect voice. If voice is heard then detector 60 enables the time of day and date generator 40. During the first enablement of generator 40, the time of day and date is transferred to the register 45 which stores the date and the start of the call. The voice detector and ring back detector 60 also enables the timer 14. The timer 14 then commences a timing cycle to therefore produce a continuous output indicative of the length of the conversation. At the end of three minutes of conversation, the three minute decoder 15 is activated and notifies the user that the conversation has lasted three minutes. The user can then decide to hang up or continue with the conversation. Due to the fact that the coder 15 is a minute decoder, it remains on for a one minute period and then will automatically go off as the timer will go from a three minute count to, for example, a four minute count. Thus the visual indicator 16 may stay on for one minute. In the case of a tone indicator as 17, this can be a pulse tone where at the end of three minutes the user will hear a beep indicating that three minutes have occurred. The timer 14 continues to run during the length of the conversation. When the conversation is terminated, the subset 10 goes from the off-hook to the on hook condition. This is detected by detector 13. Detector 13 then inhibits the timer 14 which has stored therein the total count in minutes and seconds definitive of the length of the call placed. The detection of the on-hook condition is also directed to the printer 30 which now based on the on-hook condition prints out the various information stored in registers. The output of the on-hook detector 13 is also directed to the input of the time of day and date register 40 which register transfers the date and the end of call time to register 46 prior to the activation of the printer 30. In this manner, the printer 30 which is a conventional printer will print out the following information based on the above described call.

The printer 30 will first print out the fact that this was a call out which fact is indicated by decoder 31. The printer then will print out the contents of the timer 14 whose outputs are coupled to suitable input terminals of the printer. It is understood that the output of timer 14 is a digital output which can be decoded into decimal form by means of ordinary binary to decimal converters and applied directly to the printer to be printed out in conventional form. Hence the printer will then print out the exact time of the call as determined by the timer 14. The printer will also print out the stored called number as stored in register 25 thus giving the user the exact telephone number that was called during the above described procedure. The printer will also print out on a separate line the date and the time the call started which is the information stored in register 45. The printer will further print out the date and the time that the call ended which is the information stored in register 46. Hence in regard to any generated call, the above described information will be printed out in hard copy via printer 30. It is understood that the data stored in registers 45 and 46 is repetitive in regard to the data stored in timer 14. However, timer 14 produces an exact time printout, for example which may read 3 minutes 10 seconds or 56 seconds and so on. In order to obtain the same information from registers 45 and 46, the user would be required to perform a subtraction and so on.

The above described procedure is essentially more convenient. In any event, the start and the end of call information is necessary for the user so as to inform him as to the exact time of day or night that the call was made and when the call was terminated. This, of course, is a main mode of operation as a user would be primarily concerned with the length of calls that are made via his subset. It can also be shown that if the call was not completed, the following sequence of events would occur.

In a similar manner the off-hook detector would recognize the off-hook condition and register 20 would be enabled. Register 20 would store the called number as previously explained and transfer the contents to the stored call number register 25. The telephone system may not be able to complete the call due to the fact that the called line may be busy or that the called line may not answer the call. In any event, the user would hang up thus activating the on-hook detector 13 which would then cause the printer to print out the called number as stored in register 20. The time of day and date register 40 would not be activated due to the fact that the voice detector and ring back circuit would still inhibit the same. This is true for timer 14 which also would not indicate. In this manner the consumer would have information many weeks later of calls that he did make in a printed form which calls were not answered or otherwise completed. This may prove very beneficial in regard to record keeping and various other factors.

It is, of course, understood that when the phone is on-hook all registers as well as other circuits are completely reset. This is shown by a reset which is connected to the output of the on-hook detector 13. Thus the on-hook detector 13 would reset the timer 14 via the reset circuit after a given delay afforded by the reset circuit. It would reset the called registers 20 and 25 as well as registers 44 and 46, thus placing the unit in its quiescent state to allow the unit to then process matter regarding a new call.

INCOMING CALL MODE

In the case of an incoming call, subset 10 remains on-hook, and hence the on-hook detector 13 restrains timer 14 and the circuit is in a quiescent condition. During the time when the subset 10 is being called by another line, a ringing signal is applied to the subset between the T and R lines. The ringing signal is conventionally a 20 cycle signal which stays on for a duration of two minutes and off for a duration of two minutes. In any event, if subset 10 were an electronic subset, this ringing signal could be at some other frequency. As is well understood, the exact ringing frequency is not important. A ring detector 70 will detect the particular frequency associated with the ringing signal. Upon detection of a ringing signal, the ring detector will detect each ringing signal and provide a pulse. These pulses are counted in counter 71 which essentially stores the number of ringing signals applied to subset 10. Counter 71 is preset to accommodate a given number of rings which as will be explained is pertinent to allow a consumer to receive some written indication that he had received a telephone call.

First, let us assume that the subset 10 is not answered. Hence the ring detector 70 will detect each ringing signal and produce a pulse output which would be stored in the ring detector counter 71. At the end of N rings which for example may be five or six depending on the preferences of the consumer, the ring detector 71 via an appropriate decoder will enable the call-in decoder 72 which call-in decoder will immediately send an input to the printer 30. Upon receiving a call-in input, the printer will print out an indication that a call has been received by the subset 10. The call-in detector 72 will also activate the time of day and date generator 40 to cause the contents to be transferred to register 45. In this manner, the printer will print out the fact that a call has been received as well as the date and the time that the call has been received. As indicated previously, the register 45 stores a start of call data but essentially stores the date and the time of day.

Hence when subset 10 receives a call and is unable to answer that call, the printer, after a predetermined number of rings have been detected, will print out the fact that a call has been made to the subset as well as the time and the day that the call was made. As one can readily ascertain, this information will also be extremely valuable to a user. For example, the user can then determine when he received a call and at what time the call was received, and this information may be extremely useful in order for a user to verify the fact that certain individuals or companies indicated they called but there was no one to answer.

Let us now assume that the subset 10 receives a call and is able to answer the call. During these conditions, the ring detector 70 will still operate but the N ring detector counter 71 will not respond due to the fact that the subscriber associated with subset 10 will now go off-hook. As soon as the subscriber goes off-hook, the off-hook detector 12 is activated. This immediately primes the timer 14. during this off-hook, the time of day and date generator 40 is also activated. In any event, since the ring detector counter 71 has not completed its count, it still has counted at least one ring signal. Hence the output from counter 71 activates one input of AND gate 80. The AND gate 80 enables the call-in decoder 72 while at the same time enables the time of day and date generator 40.

Thus the time of day and date generator 40 is activated due to the dual enablement by the off-hook detector 12 and gate 80 to respond to a received call. It then causes the contents to be transferred to register 45 in a similar manner for the above described mode. At the end of the call, the subscriber again hangs up whereby the on-hook detector again becomes active thus causing the time of day and date generator to transfer its contents to register 46. The called number storage register 20, as indicated, is inhibited by the output of the N ring detect count, and therefore there is no stored call number. In any event, the call in module 72 is also enabled during this mode to enable the printer, therefore, to print out the fact that there was a call into subset 10 to enable the contents of register 45 and 46 to be also printed indicating the time the call started as well as the date and the time the call ended as well as the date.

The printer will also print out the time that the call lasted via timer 14 which again was activated as soon as the subscriber went off-hook and voice was detected. It is noted that the voice detector will of course detect voice either on an outgoing conversation or an ingoing conversation, and when a person answers the phone, the normal response is for the person to indicate by a hello or some other greeting. This, of course, is detected by voice detector 60 which again activates the timer 14 to give the consumer the actual indication of the the time that conversation took place during a telephone call. This aspect is, of course, extremely important as the consumer does not have to pay for connection times made by the telephone switching system and should only pay for the time that conversation actually transpired.

It is important for the consumer to know how long a conversation actually lasted. In this manner based on the above described system, the consumer knows the exact conversation time via timer 14 on both calls that are generated from his subset and on calls that are received from his subset. Thus the consumer has all pertinent information in regard to all telephone calls made on the subset as well as information regarding incomplete telephone calls or received telephone calls when the consumer was absent.

Figure 2:
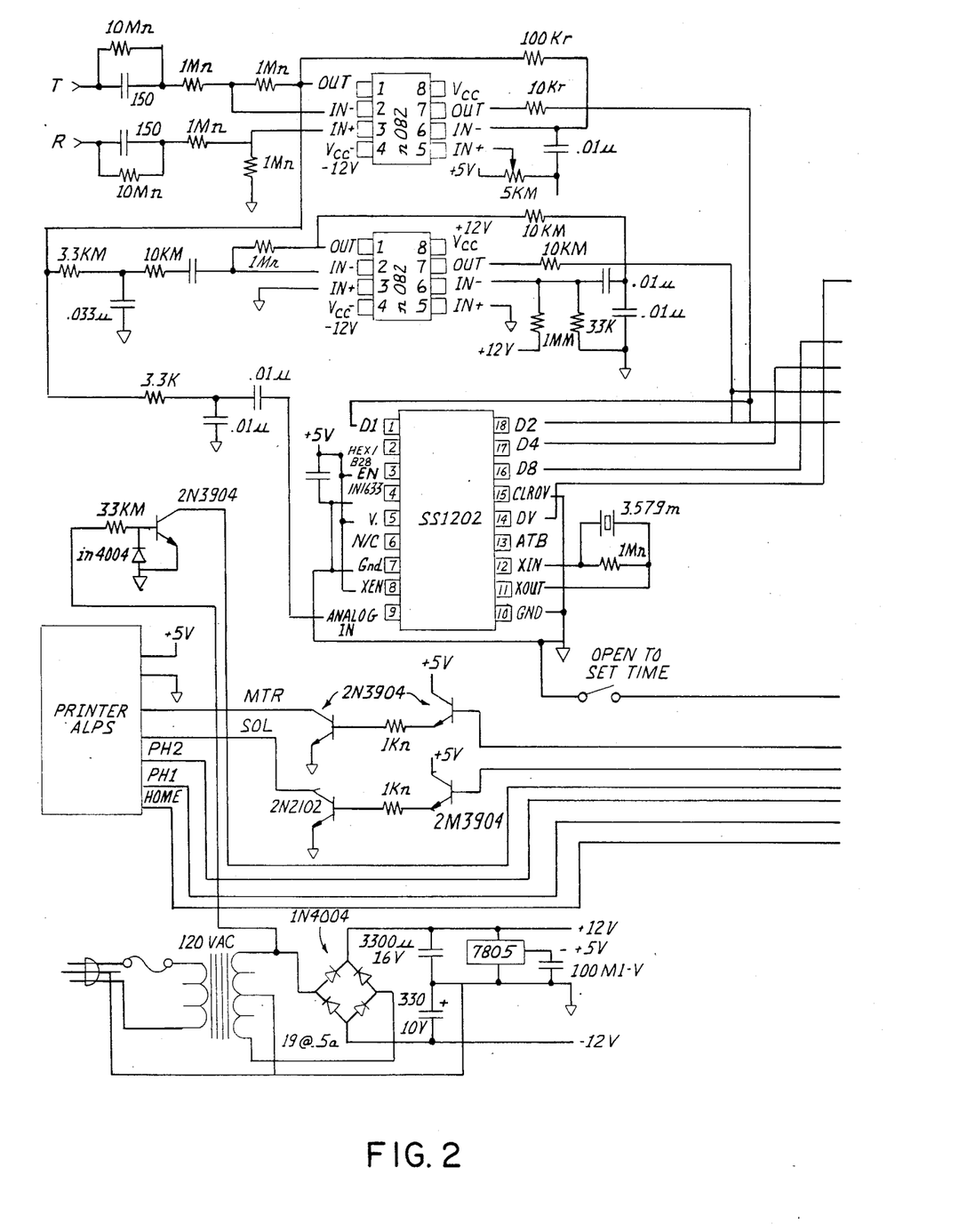
FIG. 2 is a schematic diagram of the telephone monitoring system depicted in FIG. 1.
Figure 3:
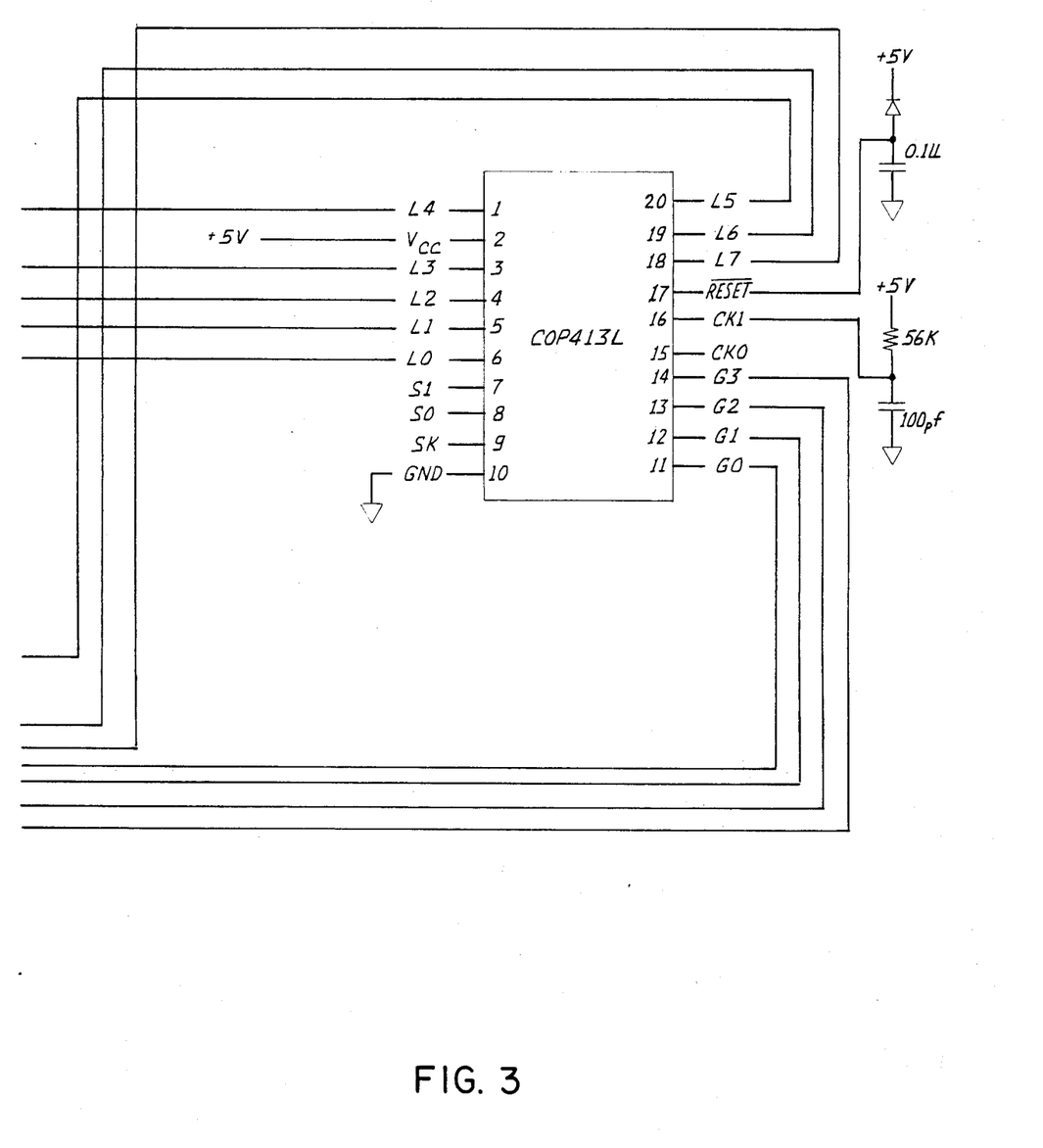

Referring to FIG. 2, there is shown an integrated circuit implementation of the system shown in FIG. 1. It is noted that in FIG. 2 the telephone subset is omitted but the T and R lines are shown together with various component values which indicate adjacent to the same the component value. All capacitors have been indicated in micro microfarads while the resistor values are indicated accordingly in regard to megohms kilohms and so on. Essentially, as shown, the functions of the on- and off-hook detector are performed by the integrated circuits designated as TL082. These circuits are available from many sources. The input resistors and capacitors whose values are shown on the schematic are used to provide proper buffering to the units as well as proper bias.

The function of the tone detector 21 as shown in FIG. 1 is provided by the integrated circuit chip designated as SSI202. This integrated circuit chip is available from the SSI Company and many other manufacturers- who supply a suitable tone decoder. It is noted that the chip includes a crystal which operates at a frequency of 3.579 megaherz to provide proper timing for the chip in regard to converting pulses to digital data. The output of the tone decoder is coupled to inputs of a microprocessor designated as COP413L. This microprocessor is manufactured by the National Semiconductor Company. The microprocesor in conjunction with the tone decoder provides the time of day and date storage capabilities as for example provided register 40 of FIG. 1. The microprocessor also has storage capabilities to enable the storage of the called number as implemented by register 20 of FIG. 1 as well as providing memory capability for implementing the storage required by register 25 and registers 45 and 46 of FIG. 1.

The output lines of the microprocessor which are output data lines are coupled to inputs of an ALPS printer which is an available printer. The printer is also driven by the outputs L6 and L7 of the microprocessor which essentially transfers data to the printer in a serial manner. The set time switch is shown coupled between the tone decoder and the input to the microprocessor which enables the user to set the time and date which is continuously updated by the microprocessor by depressing of the set time switch in a similar manner as described above. It is also completely understood that the tone decoder as the SSI202 can be replaced for a rotary subset by a similar functioning unit.

In regard to FIG. 2, the unit will perform all functions as the unit described in FIG. 1 where the main differences being that all storage as for example storage implemented by registers 20, 25, 45 and 46 is accomplished by the memory locations of the microprocessor depicted. The microprocessor also counts dial pulses and stores the dialed number as indicated. The tone decoder will operate to detect the various ringing signals including ring detection and voice and ring back detection which is well known. Such tone decoders are available with means for detecting ring back including time out circuits as well as algorithms for the detection of voice. These circuits are also well known.

Also shown in FIG. 2 is a power supply circuit which is a simple fullwave rectifier deriving its input voltage via a transformer from the AC line. The microprocessor also receives a 60 cycle clock reference signal from transistor designated as 2N3904. This transistor is coupled to the secondary of the transformer to provide at its output a 60 cycle clock reference squarewave which is applied to the input of the microprocessor. The 60 cycle squarewave is utilized by the microprocessor for producing the time of day and date as required. It is, of course, understood that 60 cycles divided by 60 produces a one second signal. This one second signal is used as the basis for generating the time of day in regard to hours, minutes and seconds as well as the date in regard to 24 hour intervals. Essentially, the microprocessor functions in the same exact way as a digital watch would function to provide the time of day and date.

The tone decoder as indicated above, also enables the user to set the exact time via the set time switch by utilizing the touch tone keypad of the telephone subset or the rotary keypad of the telephone subset. Both units as is understood produce pulses which are applied to the microprocessor to advance or retard the time of day and date circuitry associated therewith.

Hence the above described system is completely compatible with conventional telephone subsets and can be fully implemented in integrated circuit form. Functions shown in FIG. 1 such as the 3-minute decode as well as the callout and call in decoders are easily provided in terms of proper programming for the microprocessor. In this manner, the entire circuitry and structure can be implemented as shown in FIG. 2 for the case of a TTMF telephone. It is also apparent that many other circuit embodiments can be envisioned which would incorporate the above described principles and which will not depart from the spirit and scope of the claims appended hereto.

I claim:

1. A telephone monitoring system for monitoring the status of incoming and outgoing calls to a telephone subset, said telephone subset capable of operating in an on-hook or off-hook condition, and including a dialer for accessing a called number in the off-hook condition, comprising:
    means responsive to the on-off hook condition of said subset to provide a first output signal for an off-hook condition and a second output signal for an on-hook condition,
    storage means responsive to said first output signal for storing therein a number indicative of a dialed number for accessing a called party,
    means responsive to said called party answering said call for providing an output signal,
    a time of day and date generator responsive to said output signal for storing therein in a first mode the time and date of said answer according to said output signal,
    timing means responsive to said output signal for commencing a timing cycle indicative of the time said called and calling party are in communication,
    means responsive to said second output signal indicative of said subset being in the on-hook condition and coupled to said timing means and said time of day and date generator to cause said timing means to end said timing cycle and to cause said time of day and date generator to store in a second mode said date and time said call is ended, and
    display means coupled to said timing means, said time of day and date generator and operative in response to said second signal to cause the time of said call, the day and time of the start of said call and the day and time of the end of said call to be displayed for use by a user of said subset.

2. The telephone monitoring system according to claim 1, further including detector means responsive to a ringing signal coupled to said subset and indicative of an incoming call to said subset for providing a control signal for each cycle of said ringing signal, with said control signal operative to actuate said time of day and date generator to cause said generator to store the time and date of said incoming call and means responsive to a given number of cycles of said ringing signal to provide an output signal for activating said dispay means to provide said user with a display of said day and time of said incoming call.

3. The telephone monitoring system according to claim 1, further including switching means coupled to said subset for applying dialing pulses to said time of day and date generator during a first mode state of said switching means to allow a user of said subset to set the proper time and date in said generator.

4. The telephone monitoring system according to claim 1, wherein said display means is a printer operative to provide a hard copy output of said displayed data.

5. The telephone monitoring system according to claim 1, wherein said timing means includes a separate interval timing means commencing upon the start of said timing cycle and operative to provide an output indicator signal when said separate internal timing means completes a predetermined timing interval during said timing cycle to inform a user of said subset of this kind.

6. The telephone monitoring system according to claim 1, further including means coupled to said storage means for providing an indication of an outgoing call from said subset.

7. The telephone monitoring system according to claim 2, further including means coupled to said detector means for providing an indication of an incoming call from said subset.

8. A telephone monitoring system for monitoring the states of incoming and outgoing calls to a telephone sublet, comprising:
   means coupled to said subset to provide an output signal when said subset goes off-hook,
   means responsive to said off-hook condition for determining whether said subset is placing a call in a first mode or receiving a call in a second mode,
   timing means operative to commece a timing cycle during said first mode upon completion of a placed call and for commencing said timing cycle during said second mode when said subset answers said received call,
   a time of day and date generator operative in said first mode to store the date and start of call when said call is completed and said called party answers, and operative in said second mode to store the date and start of call when said subset answers, and
   means coupled to said subset for detecting the on-hook condition of said subset indicative of the end of a call to provide an output signal with said output signal coupled to said timing means and said time of day and date generator to cause said timing means to terminate said cycle and to cause said time of day and date generator to store the date and end of said call for both said first and second modes, and
   display means coupled to said timing means and said time of day and date generator for displaying said timing cycle indicative of the duration of a call, the date and start time of said call and the date and end time of said call during said first and second modes.

9. The telephone monitoring system according to claim 8, further including:
   a called number storage means operative in said first mode and responsive to said off-hook output signal to store the number of a dialed sequence initiated by said subset in placing a call.

10. The telephone monitoring system according to claim 8, further including:
    means responsive to a ringing signal coupled to said subset for detecting said signal and for providing an output when said ringing signal is present for a given period with said output applied to said time of day and date generator for causing the same to store the date and time of the start of said incoming call at the termination of said given period.

11. The telephone monitoring system according to claim 8, wherein said timing means further includes separate interval timing means operative during said timing cycle for providing an output indicative of the passage of a given time period.

12. The telephone monitoring system according to claim 8, wherein said display means includes a printer for providing a hard copy printout of said duration of said call, the date and start time of day and date generator during a setting mode to allow a user of said subset to set the proper time and date in said generator.

13. The telephone monitoring system according to claim 8, wherein said display means includes a printer for providing a hard copy printout of said duration of said call, the date and start time of said call and the date and end time of said call.

14. The telephone monitoring system according to claim 8, wherein said display means includes an LED display for providing a visual display of said duration of said call, the date and start time of said call and the date and end time of said call.

15. The telephone monitoring system according to claim 8, further including means coupled to said subset for detecting dialing information.

16. The telephone monitoring system according to claim 15, wherein said dialing information detected is Touch Tone dialing information.

17. The telephone monitoring system according to claim 15, wherein said dialing information detected is rotary dialing information.

18. The telephone monitoring system according to claim 8, further including means for indicating a placed call.

19. The telephone monitoring system according to claim 8, further including means for indicating a received call.

20. The telephone monitoring system according to claim 8, further including separate display means coupled to said time of day and date generator for providing a display of the time of day and date.

* * * * *